No. 730,754. PATENTED JUNE 9, 1903.
E. W. FLAGG.
THRESHING MACHINE.
APPLICATION FILED APR. 4, 1903.
NO MODEL.
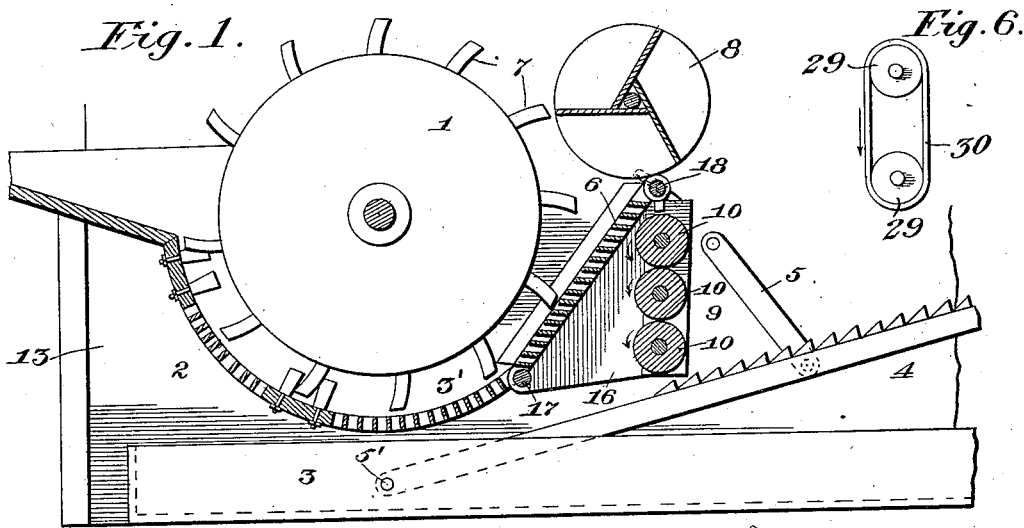
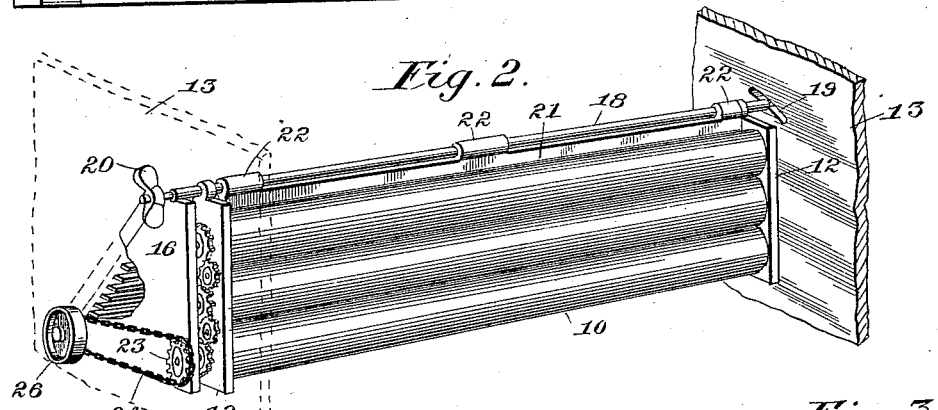
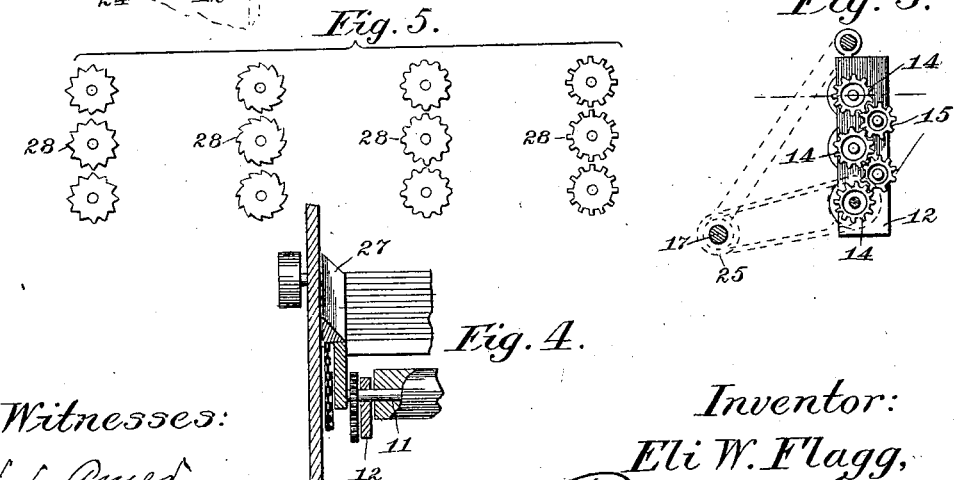
Witnesses:
H. L. Ames.
Edwin G. McKee.
Inventor:
Eli W. Flagg,
by Perford M. Smith.
Atty.

No. 730,754. Patented June 9, 1903.

UNITED STATES PATENT OFFICE.

ELI W. FLAGG, OF BATTLECREEK, MICHIGAN, ASSIGNOR TO NICHOLS AND SHEPARD COMPANY, OF BATTLECREEK, MICHIGAN.

THRESHING-MACHINE.

SPECIFICATION forming part of Letters Patent No. 730,754, dated June 9, 1903.

Application filed April 4, 1903. Serial No. 151,057. (No model.)

*To all whom it may concern:*

Be it known that I, ELI W. FLAGG, a citizen of the United States, residing at Battlecreek, in the county of Calhoun and State of Michigan, have invented a certain new and useful Improvement in Threshing-Machines, of which the following is a specification, reference being had therein to the accompanying drawings.

This invention relates to threshing-machines, the object of the present invention being to provide a movable grain-check or, in other words, a device comprising a movable grain-impinging surface and located directly in rear of a grate which is steeply inclined from the rear end of the concave upward in close proximity to the sweep of the cylinder-teeth, the said grain-check being adapted to catch and stop the grains or kernels which pass through the grate and by reason of the movable surface of such grain-check to direct said grains or kernels downward into the grain-pan located beneath the same and also extending under the grate and straw-carrier sections.

With the above and other objects in view, the nature of which will more fully appear as the description proceeds, the invention consists in the novel construction, combination, and arrangement of parts, as hereinafter fully described, illustrated, and claimed.

In the accompanying drawings, Figure 1 is a vertical longitudinal section through a sufficient portion of a threshing-machine to illustrate the nature of the present invention and its application thereto. Fig. 2 is a detail perspective view of the grain-check, showing its relation to the machine and the means for operating the rotary members of the grain-check. Fig. 3 is an end view of the grain-check. Fig. 4 is a detail horizontal section through the grain-check and grate. Fig. 5 is a diagrammatic end view of several sets of rotary members with various forms of grain-catching teeth or pockets. Fig. 6 is a detail end view of a modified form of grain-checking device employing a pair of rollers and an endless apron.

Like reference-numerals designate corresponding parts in all the figures of the drawings.

Referring to the drawings, 1 designates the cylinder of a threshing-machine of the usual type, 2 the concave, and 3 the grain-pan, arranged beneath the concave and extending rearwardly under the straw-carrier sections, the forward one of which is shown at 4, said straw-carrier section being supported by means of pivotal links 5 and being operatively connected pivotally to the grain-pan at 5'.

The concave 2 comprises a concave portion which is slatted or grated, as shown at 3', while extending upward at a steep inclination in rear of the cylinder is a grate 6, which forms, in effect, a continuation of the concave, said grate being steeply inclined in close relation to the sweep of the cylinder-teeth 7.

Located over the upper end of the grate 6 is a rotary beater 8, which operates upon the straw moving forward over the grate 6 and deflects said straw and delivers the same over the top of the grate and in rear thereof upon the initial straw-carrier section 4, the straw being carried thence to the rear and discharged from the machine.

This invention contemplates the use of a grain-check 9, located immediately in rear of the grate 6 and composed of a substantially vertical series of rotary members 10. These rotary members are shown in the form of rollers having extended shafts 11, which are received and adapted to turn in journal bars or plates 12, arranged one at each side of the machine and just within the sides 13 of the casing. At one end the journals of the rollers 10 extend through the adjacent journal bar or plate 12 and are provided with spur gear-wheels 14, fast thereon and caused to rotate simultaneously by means of interposed idle pinions 15. The gears 14 and 15 are located between the journal-plate 12 and a cheek-plate 16, which lies close to the inner surface of the adjacent side 13 of the machine-casing. Two of these cheek-plates 16 are employed, one at each side of the machine, the same extending forward and connecting with and forming part of the frame of the grate 6, as shown in Figs. 1, 2, and 4. The grate 6 is pivotally connected at 17 to the rear edge of the concave through the medium of the cheek-plates 16, which are provided with openings for the reception of the pivot 17, which may consist of a rod or bolt.

At the upper end of the grate and grain-check there is arranged a rod or shaft 18, the extremities of which are adjustable in arc-shaped slots 19, formed in the sides 13 of the casing, whereby said rod or shaft 18 may be moved in the arc of a circle of which the pivot 17 of the grate is the center. When the rod or bolt 18 is properly adjusted, the same is made fast by means of thumb screws or nuts 20. 21 designates a guard in the form of a strip extending lengthwise of and above the upper rotary member 10, so as to prevent the grains or kernels from flying over said upper member after passing through the grate 6. The guard 21 is provided with knuckles or sleeves 22 to receive the rod or bolt 18, by means of which said rod is supported.

The shaft or journal of one of the rotary members 10, preferably the lower one, is extended through one of the cheek-plates 16 and provided with a sprocket-wheel 23, which receives a driving-chain 24, the latter passing around the sprocket-wheel 25 on the shaft 17, the latter being also provided with a driving-wheel 26, to which motion is communicated by means of a suitable belt. The driving arrangement described does not interfere with the adjustment of the rod or shaft 18, such adjustment being effected for the purpose of varying the angle of the grate 6 and the grain-check 9.

27 designates fender strips or guards secured to the forward edges of the cheek-plates 16, so as to cover the sprocket-chain 24 and the sprocket-wheels in connection with which said chain operates, thereby preventing flying grain from interfering with the operation of said parts.

The rotary members or rollers 10 may be left smooth, if desired; but this invention also contemplates providing said rollers with teeth 28 of any desired or preferred form, several forms of teeth being illustrated in Fig. 5. The teeth 28 are adapted to catch the flying grains or kernels and direct the same downward into the grain-pan, rotary motion being imparted to the rollers or members 10 in such direction as to cause their forward surfaces to travel downwardly, as indicated by the arrows in Fig. 1. I therefore desire to be understood that I do not limit myself to the use of any special kind of roller or particular shape of teeth thereon. It will also be understood that any desired number of rollers or rotary members 10 may be employed, the diameter of the rollers varying with the number of rollers employed. The rotary members 12 are arranged in a substantially vertical series, extending from the upper end of the grate 6 downward to about the plane of the lower end thereof, but not low enough to interfere with the operation of the adjacent straw-carrier section 4. Furthermore, any usual or preferred means may be resorted to for imparting rotary motion to the members 10, the drawings simply showing one means of imparting motion to said rollers. These and other changes may be made in the form, proportion, and minor details of construction without departing from the principle or sacrificing any of the advantages of the invention.

Instead of employing a plurality of rollers for the grain-checking device the latter may consist of a pair of rollers 29, located substantially the same as the upper and lower rollers 10, (shown in Fig. 1,) and an endless apron or flexible guard 30, which travels around said rollers and is actuated thereby, so that the inner surface of the apron or that side which is next to the grate moves in a downward direction, as indicated by the arrow. The apron 30 may be actuated at any desired speed and may be made either plain or provided with teeth, said apron serving in either instance to check the flying grains and direct the same downward.

Having thus described the invention, what I claim as new, and desire to secure by Letters Patent, is—

1. A threshing-machine comprising a cylinder, a concave, a grate arranged in rear of the cylinder and steeply inclined in close relation to the sweep of the cylinder-teeth, and a grain-check having a movable surface operating immediately in rear of said grate, substantially as described.

2. A threshing-machine comprising a cylinder, a concave, a grate extending upward from the rear edge of the concave and steeply inclined in close relation to the sweep of the cylinder-teeth, and a grain-check arranged immediately in rear of the grate and embodying a plurality of rotary members.

3. A threshing-machine comprising a cylinder, a concave, a grate extending upward from the rear of the concave and steeply inclined in close relation to the sweep of the cylinder-teeth, a grain-check located immediately in rear of the grate and embodying a downwardly-moving surface next to the grate, and means for adjusting the angle of the grate and grain-check.

4. A threshing-machine comprising a cylinder, a concave, a grate extending upward from the rear edge of the concave and inclined in close relation to the sweep of the cylinder-teeth, a shaft or rod adjustably connected with the machine-casing and forming a movable support for the upper end of the grate, a grain-check embodying a plurality of rotary members arranged in a substantially vertical series immediately in rear of the grate, and a guard interposed between the upper rotary member and the movable rod or shaft which supports the grate.

5. A threshing-machine comprising a cylinder, a concave, a grate extending upward from the rear edge of the concave and steeply inclined in close relation to the sweep of the cylinder-teeth, a grain-check located immediately in rear of the grate and embodying a substantially vertical series of rollers, a rod or shaft located at the upper end of the grate and forming a common support for the grate and grain-check, and means for imparting rotary motion to said rollers.

6. A threshing-machine comprising a cylinder, a concave, a grate extending upward from the rear edge of the concave and steeply inclined in close relation to the sweep of the cylinder-teeth, and a grain-check located immediately in rear of the grate and embodying a series of rollers driven simultaneously in the same direction and provided with teeth or pockets, substantially as and for the purpose specified.

In testimony whereof I affix my signature in presence of two witnesses.

ELI W. FLAGG.

Witnesses:
   O. GESAMAN,
   BEN. C. BURGESS.